United States Patent
Iwakura

(10) Patent No.: US 9,736,080 B2
(45) Date of Patent: Aug. 15, 2017

(54) DETERMINATION METHOD, DEVICE AND STORAGE MEDIUM

(71) Applicant: FUJITSU LIMITED, Kawasaki-shi, Kanagawa (JP)

(72) Inventor: Hirokazu Iwakura, Adachi (JP)

(73) Assignee: FUJITSU LIMITED, Kawasaki (JP)

( * ) Notice: Subject to any disclaimer, the term of this patent is extended or adjusted under 35 U.S.C. 154(b) by 124 days.

(21) Appl. No.: 14/603,449

(22) Filed: Jan. 23, 2015

(65) Prior Publication Data
US 2015/0256469 A1    Sep. 10, 2015

(30) Foreign Application Priority Data

Mar. 4, 2014 (JP) ................................. 2014-041247

(51) Int. Cl.
*H04L 12/823* (2013.01)
(52) U.S. Cl.
CPC ................................. *H04L 47/32* (2013.01)
(58) Field of Classification Search
CPC ......... H04L 12/56; H04L 47/32; H04L 69/22; H04B 7/18584
See application file for complete search history.

(56) References Cited

U.S. PATENT DOCUMENTS

| | | | |
|---|---|---|---|
| 2002/0046264 A1* | 4/2002 | Dillon | H04B 7/18584 709/219 |
| 2006/0168205 A1* | 7/2006 | Barron | H04L 41/12 709/224 |
| 2015/0207905 A1* | 7/2015 | Merchant | H04L 69/22 370/390 |
| 2015/0324234 A1* | 11/2015 | Chang | G06F 9/5016 718/104 |

FOREIGN PATENT DOCUMENTS

| | | |
|---|---|---|
| JP | 2006-246195 | 9/2006 |
| JP | 2009-207099 | 9/2009 |

* cited by examiner

*Primary Examiner* — Christopher Grey
*Assistant Examiner* — Richard Schnell
(74) *Attorney, Agent, or Firm* — Staas & Halsey LLP

(57) ABSTRACT

A determination method executed by a processor included in a device configured to receive a plurality of copied packets, the determination method includes receiving a first copied packet that is a copy of a first packet including an identifier and session information; determining that the first copied packet is a duplicate packet when information of the identifier is stored in a memory; storing the information of the identifier in the memory when the information of the identifier is not stored in the memory; and deleting the information of the identifier stored in the memory when a second copied packet that is a copy of a second packet that includes session information indicating a session that is the same as a session indicated by the session information included in the first packet, a communication direction of the second packet being opposite to a communication direction of the first packet, is received.

12 Claims, 20 Drawing Sheets

FIG. 6

| CONNECTION DESTINATION IP ADDRESS | CONNECTION DESTINATION PORT NUMBER | CONNECTION SOURCE IP ADDRESS | CONNECTION SOURCE PORT NUMBER | LATEST COMMUNICATION DIRECTION | LATEST MESSAGE NUMBER | CURRENT CPU NUMBER |
|---|---|---|---|---|---|---|
| 10.1.1.1 | 80 | 1.1.1.1 | 10000 | 10.1.1.1 | 34 | CPU1 |
| 10.1.1.2 | 8002 | 1.1.1.2 | 20000 | 1.1.1.2 | 32 | CPU2 |
| 10.1.1.3 | 8080 | 1.1.1.3 | 30000 | 10.1.1.3 | 33 | CPU2 |

FIG. 7

| CPU NUMBER | NUMBER OF MESSAGES |
|---|---|
| CPU1 | 12 |
| CPU2 | 11 |
| ⋮ | ⋮ |

FIG. 14

| TCP HEADER | TRANSMISSION SOURCE port NUMBER | | TRANSMISSION DESTINATION port NUMBER | |
|---|---|---|---|---|
| | SEQUENCE NUMBER | | | |
| | CONFIRMATION RESPONSE NUMBER | | | |
| | HEADER LENGTH | RESERVATION BIT | FLAG | WINDOW SIZE |
| | CHECKSUM | | EMERGENCY POINTER | |
| | OPTION | | PADDING | |

FIG. 15

| UDP HEADER | TRANSMISSION SOURCE port NUMBER | TRANSMISSION DESTINATION port NUMBER |
|---|---|---|
| | DATA LENGTH | CHECKSUM |

DETERMINATION METHOD, DEVICE AND STORAGE MEDIUM

CROSS-REFERENCE TO RELATED APPLICATION

This application is based upon and claims the benefit of priority of the prior Japanese Patent Application No. 2014-041247, filed on Mar. 4, 2014, the entire contents of which are incorporated herein by reference.

FIELD

The embodiments discussed herein are related to a determination method, a device, and a storage medium.

BACKGROUND

A packet transmitted through a network is captured and the captured packet is analyzed. For example, FIG. 1 illustrates a network to which three switches SW1, SW2, and SW3 are coupled. As illustrated in FIG. 1, servers A and B are coupled to the switch SW2, servers C and D are coupled to the switch SW3, and the switch SW1 is coupled to the switch SW2 and the switch SW3. In this case, the switch SW2 designates a port to which the server B is coupled as a target port of a mirroring in order to capture a packet generated when the server B communicates with the server A or the server C. Then, as illustrated by the dashed line, the switch SW2 causes a port coupled to an analysis device to output a copied packet. Similarly, the switch SW3 designates a port to which the server C is coupled as a target port of mirroring in order to capture a packet generated when the server C communicates with the server B or the server D. Then, as illustrated by the dashed line, the switch SW3 causes a port connected to the analysis device to output a copied packet.

Thus, a packet that is transmitted and received between the server A and the server B and a packet transmitted and received between the server B and the server C are transmitted from the switch SW2 to the analysis device. A packet that is transmitted and received between the server B and the server C and a packet that is transmitted and received between the server C and the server D are transmitted from the switch SW3 to the analysis device. In this case, the packets transmitted and received between the server B and the server C overlap one another, and therefore, an extra packet is discarded in the analysis device.

Conventionally, focus has been put on such discard of an extra packet. However, no other special measure has been taken than the basic processing of discarding one of the same packets which is received later. Specifically, the capacity of a memory used for discarding an extra packet becomes a problem as the number of packets that are to be captured increases. However, a technique in which reduction in capacity of a memory is examined has not yet been disclosed. It is preferable that the capacity of a memory used for removing a duplicate packet of packet captured from a communication device may be reduced.

Related art is described, for example, in Japanese Laid-open Patent Publication No. 2006-246195 and Japanese Laid-open Patent Publication No. 2009-207099.

SUMMARY

According to an aspect of the invention, a determination method executed by a processor included in a device configured to receive, via one or more switches, a plurality of copied packets that are respective copies of a plurality of packets communicated via a path connecting a first device and a second device and determine whether each of the plurality of received copied packets is a duplicate packet, the determination method includes receiving a first copied packet that is a copy of a first packet that is communicated via the path and includes an identifier and session information; determining that the first copied packet is the duplicate packet when information of the identifier is stored in a memory included in the device; storing the information of the identifier in the memory when the information of the identifier is not stored in the memory; and deleting the information of the identifier stored in the memory when a second copied packet that is a copy of a second packet that includes session information indicating a session that is the same as a session indicated by the session information included in the first packet, a communication direction of the second packet being opposite to a communication direction of the first packet, is received.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of data stored in a session table;

FIG. 7 is a diagram illustrating an example of data stored in a sort table;

FIG. 14 is a diagram illustrating a structure of a TCP header;

FIG. 15 is a diagram illustrating a structure of a UDP header;

DESCRIPTION OF EMBODIMENTS

First Embodiment

Figure 3:
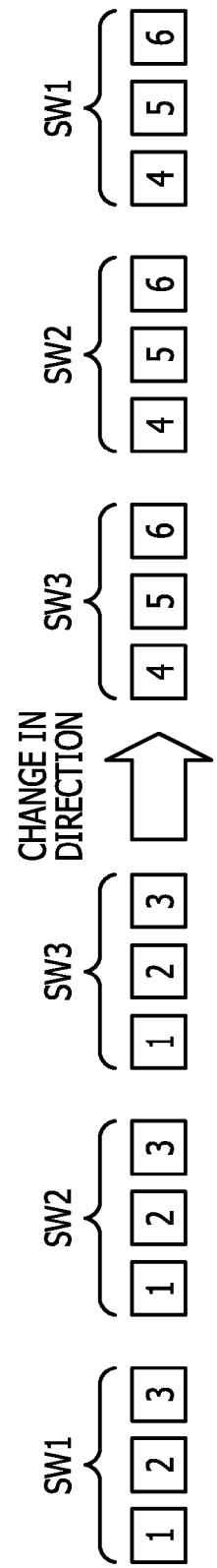
FIG. 3 is a diagram schematically illustrating transmission and reception of a message.
Figure 4:
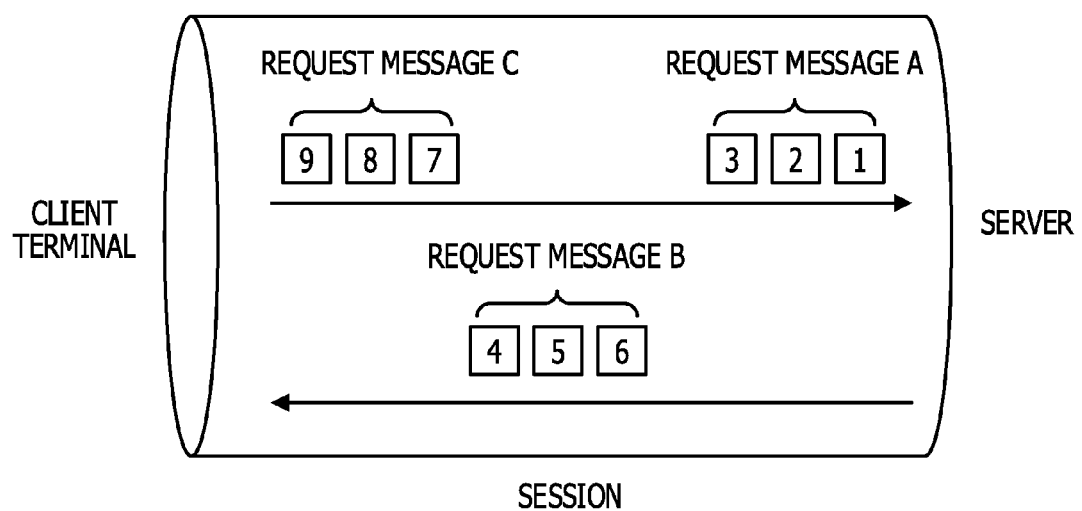
FIG. 4 is a diagram schematically illustrating a message transmitted and received in the same session.

The outline of a system according to this embodiment will be described with reference to FIG. 2 to FIG. 4.

Figure 1:
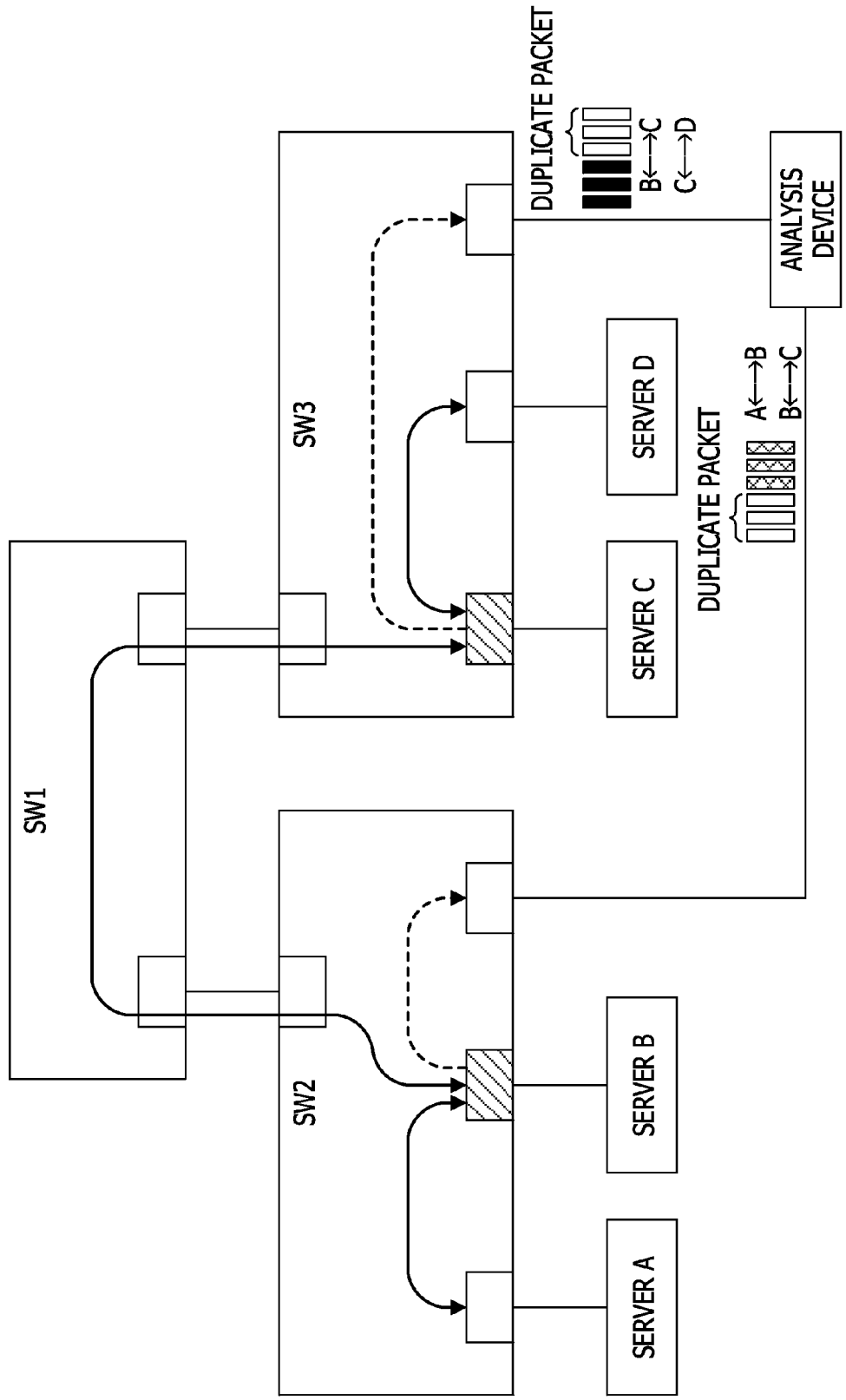
FIG. 1 is a diagram illustrating an example of the relationship between a switch and an analysis device.
Figure 2:
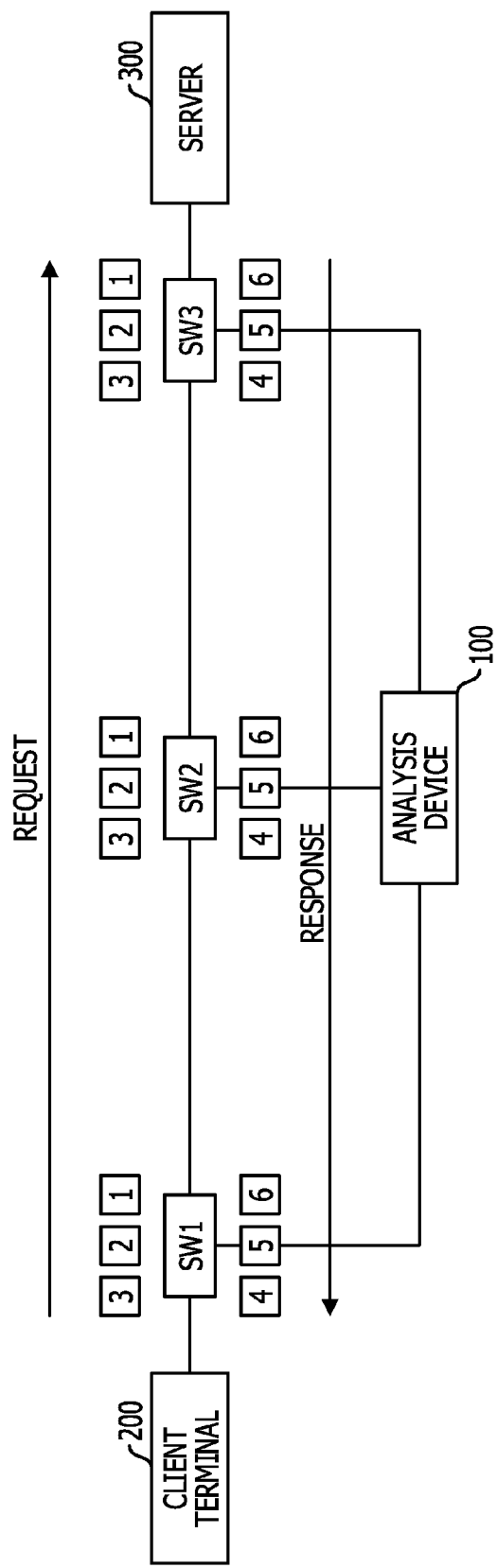
FIG. 2 is a diagram illustrating an example of connection between an analysis device and a switch according to a first embodiment.

For example, as illustrated in FIG. 2, an analysis device 100 according to this embodiment is coupled to a switch SW1, a switch SW2, and a switch SW3. A client terminal 200 is coupled to the switch SW1, and a server 300 is coupled to the switch SW3. The switch SW1 and the switch SW2 are coupled each other, and the switch SW2 and the switch SW3 are coupled to each other.

In the above-described case, when a request including packets 1 to 3 are transmitted from the client terminal 200 to the server 300, the request is transferred to the server 300 via the switch SW1, the switch SW2, and the switch SW3. Thus, as illustrated in FIG. 3, the analysis device 100 receives three copied packets, which are copies of the three packets 1 to 3, from the switch SW1, receives three copied packets, which are copies of the three packets 1 to 3, from the switch SW2, and receives three copied packets, which are the three packets 1 to 3, from the switch SW3. Note that a copied packet will be also referred to as a copy packet below.

Thereafter, when a response including packets 4 to 6 are transmitted from the server 300 to the client terminal 200, the response is transferred to the client terminal 200 via the switch SW3, the switch SW2, and the switch SW1. Thus, as illustrated in FIG. 3, the communication direction is inverted, the analysis device 100 receives copied packets of the three packets 4 to 6 from the switch SW3, receives copied packets of the three packets 4 to 6 from the switch SW2, and receives copied packets of the three packets 4 to 6 from the switch SW1.

As described above, a request and a response in the same session are transmitted in opposite directions to each other. As illustrated in FIG. 4, there are also cases where transmission and reception of a plurality of messages are performed in the same session. That is, when a request message A is transmitted from the client terminal 200 to the server 300, the communication direction is inverted, and a response message B is transmitted to the client terminal 200. Furthermore, the communication direction is inverted, and a request message C is transmitted from the client terminal 200 to the server 300.

As described above, in the same session, a phenomenon in which, when a message is received by a destination device, a communication direction is inverted and a next message is transmitted is repeated. Thus, also in the analysis device 100, when the communication direction is inverted, a different message is received, and therefore, it is understood that it is efficiency that whether or not a received packet is an extra packet that is duplicated and thus received is determined between an inversion of a communication direction and a next inversion of the communication direction.

More specifically, for the same session, assuming that a portion from an inversion of a communication direction to a next inversion of the communication direction is a single message, an identifier of a packet included in the single message is held. Then, when a packet including the same identifier is received, a basic processing of discarding the packet is performed. Furthermore, when it is detected next that the communication direction is inverted, the identifier of the packet that is currently held is not to be used, and therefore, is discarded, and an identifier of a packet regarding a next message is held. In the above-described manner, a holding time in which an identifier of a packet is held is very short, and the consumption of a memory capacity is reduced.

Figure 5:
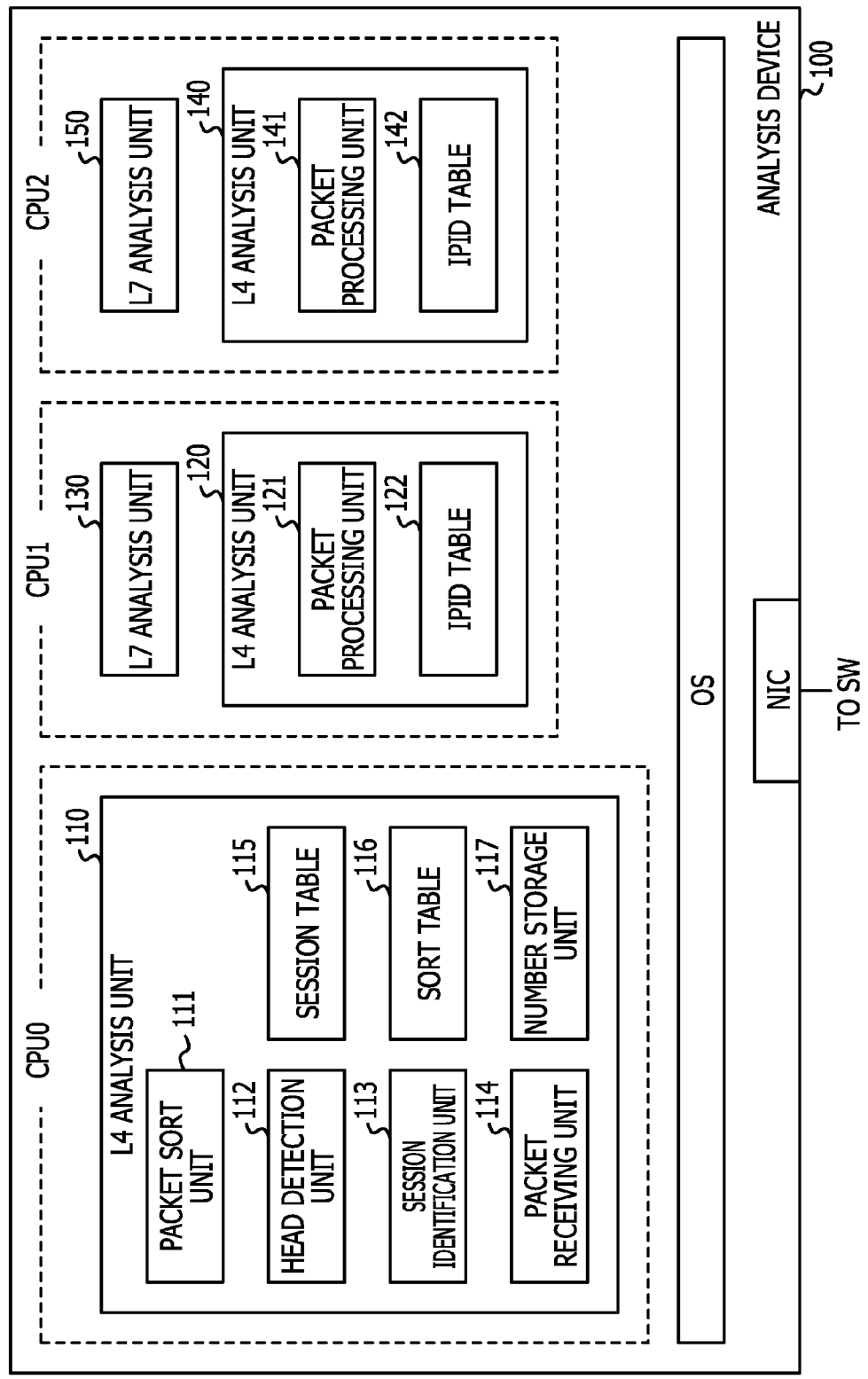
FIG. 5 is a function block diagram of an analysis device according to the first embodiment.

Next, FIG. 5 illustrates a function block diagram of the analysis device 100 according to this embodiment.

In this embodiment, the analysis device 100 is configured such that a plurality of central processing units (CPU) 0 to 2 share the functions of the analysis device 100. As schematically illustrated in FIG. 5, CPU 0 obtains a copied packet received via a network interface card (NIC) and an operating system (OS), for example, in a promiscuous mode. CPU 0 executes a part of Layer-4 (L4) analysis processing. That is, CPU 0 executes an analysis program, and thus, an L4 analysis unit 110 is realized. The L4 analysis unit 110 includes a packet sort unit 111, a head detection unit 112, a session identification unit 113, a packet receiving unit 114, a session table 115, a sort table 116, and a number storage unit 117.

The packet receiving unit 114 receives a packet via OS, and outputs the packet to the session identification unit 113. The session identification unit 113 identifies a session regarding the received packet. Furthermore, the head detection unit 112 determines whether or not the received packet is a head packet of a message. Furthermore, the packet sort unit 111 sorts the received packet to CPU 1 or CPU 2, which executes analysis processing for the packet.

The session table 115 is, for example, a table illustrated in FIG. 6. In the example of FIG. 6, session data including a connection destination IP address, a connection destination port number, a connection source IP address, and a connection source port number, a latest communication direction represented by a transmission destination IP address, and a latest message number, and a current CPU number, which is the number of CPU that is currently processing the received message, are stored for each session.

The sort table 116 is, for example, a table illustrated in FIG. 7. In the example of FIG. 7, for each CPU, a CPU number and the number of messages handled by corresponding CPU are registered. As described above, in this embodiment, packet processing is sorted to each CPU not in units of session but in units of message. In the example of FIG. 4, CPU that is a sort destination is CPU 1 and CPU 2.

Figure 8:
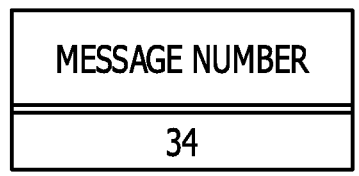
FIG. 8 is a diagram illustrating an example of data stored in a number storage unit.

The number storage unit 117 stores data illustrated in FIG. 8. In this embodiment, a serial number is given to a message which is received for the first time, and the number of a message that is being currently received is stored in the number storage unit 117.

CPU 1 executes an analysis program, and thus, an L4 analysis unit 120 and an L7 analysis unit 130 are realized. The L4 analysis unit 120 includes a packet processing unit 121 and an IPID table 122. The packet processing unit 121 performs a check using the IPID table 122 on a packet received from the packet sort unit 111. Then, if the received packet is an extra packet that is duplicated and thus received, the packet processing unit 121 discards the received packet. On the other hand, if the received packet is not an extra packet that is duplicated and thus received, the packet processing unit 121 registers IPID of the packet in the IPID table 122 and outputs the IPID to the L7 analysis unit 130.

Figure 9:
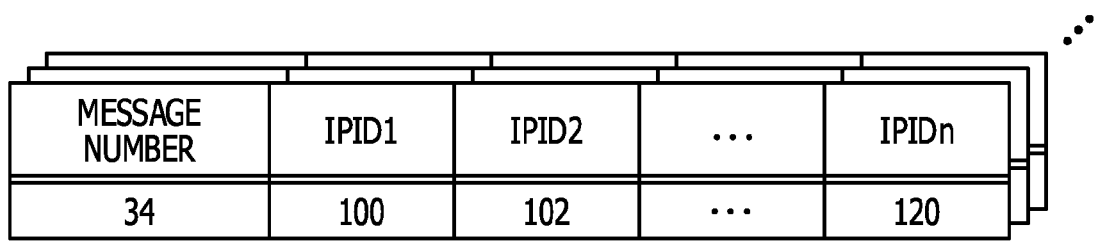
FIG. 9 is a diagram illustrating an example of an IPID table.

FIG. 9 illustrates an example of data stored in the IPID table 122. The IPID table 122 is stored, for each message, in an identifier (IPID) of a packet included in the message. In FIG. 9, a single table corresponds to an IPID table of a single message.

The L7 analysis unit 130 executes predetermined system state analysis. However, this processing is not different from that of a known technique, and will not be further described.

CPU 2 executes an analysis program, and thus, an L4 analysis unit 140 and an L7 analysis unit 150 are realized. Similar to the L4 analysis unit 120, the L4 analysis unit 140 includes a packet processing unit 141 and an IPID table 142.

Figure 10:
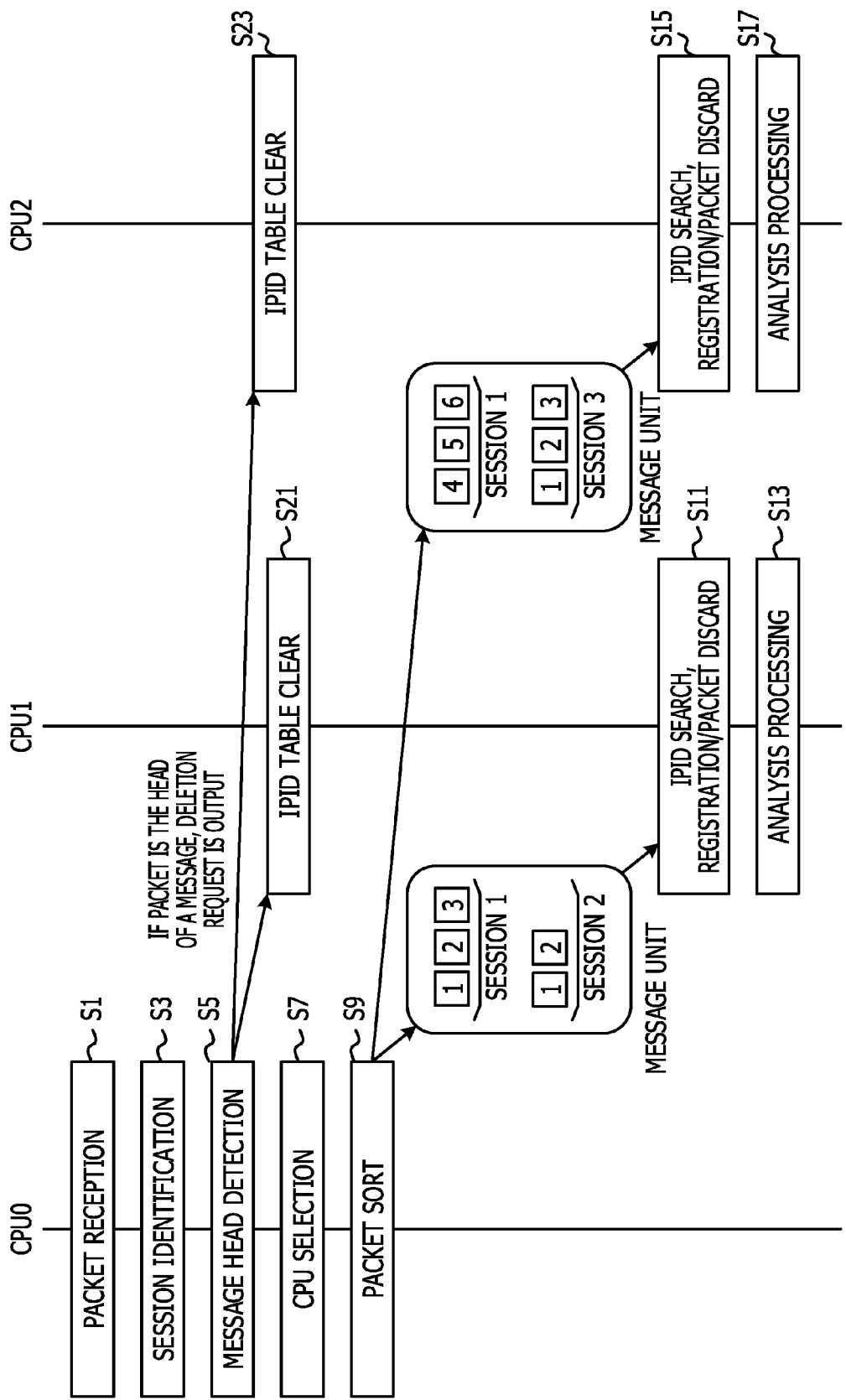
FIG. 10 is a diagram illustrating the outline of processing of an analysis device.

Next, the outline of processing of the analysis device 100 will be described with reference to FIG. 10. In CPU 0, when the packet receiving unit 114 of the L4 analysis unit 110 receives a packet (S1), the packet receiving unit 114 outputs the packet to the session identification unit 113, and the like. Thus, the session identification unit 113 identifies a session from the received packet (S3). Furthermore, the head detection unit 112 determines, based on the communication direction of the received packet, whether or not the received packet is the head of a message (S5). If the received packet is the head of the message, the packet sort unit 111 newly selects a CPU. On the other hand, if the received packet is not the head of the message, the packet sort unit 111 specifies CPU that is processing the message (S7). Then, the packet sort unit 111 outputs the received packet to selected CPU or specified CPU with the message number (S9). As illustrated in FIG. 10, packets are sorted to different CPUs not for each session, but for each message type. In the example of FIG. 10, a message of the packets 1 to 3 in a session 1 is processed by CPU 1, and a message of the packets 1 and 2 is processed by CPU 1. Also, a message of the packets 4 to 6 in the session 1 is processed by CPU 2, and a message of the packets 1 to 3 in the session 3 is processed by CPU 2.

The packet processing unit 121 of the L4 analysis unit 120 in CPU 1 performs a search for the IPID table 122 that corresponds to the message number using IPID of the received packet. Then, if the IPID of the received packet is already registered in the IPID table 122, the packet processing unit 121 discards the packet. On the other hand, if IPID of the received packet is not registered in the IPID table 122, the packet processing unit 121 registers IPID in the IPID table 122 and outputs the received packet to the L7 analysis unit 130 (S11). Then, the L7 analysis unit 130 executes predetermined analysis processing (S13).

Similarly, the packet processing unit 141 of the L4 analysis unit 140 in CPU 2 performs a search for the IPID table 142 that corresponds to the message number using IPID of the received packet. Then, if the IPID of the received packet is already registered in the IPID table 142, the packet processing unit 141 discards the packet. On the other hand, if IPID of the received packet is not registered in the IPID table 142, the packet processing unit 141 registers IPID in the IPID table 142 and outputs the received packet to the L7 analysis unit 150 (S15). Then, the L7 analysis unit 150 executes predetermined analysis processing (S17).

When the head detection unit 112 detects the head of a message, the head detection unit 112 specifies CPU that handles an immediately preceding message in the same session. Then, the head detection unit 112 outputs a deletion request for the IPID table with the number of the immediately preceding message to the specified CPU. The packet processing unit 121 of the L4 analysis unit 120 in CPU 1, which has received the deletion request, clears the IPID table 122 of the number of the immediately preceding message (S21). Similarly, the packet processing unit 141 of the L4 analysis unit 140 in CPU 2, which has received the deletion request, clears the IPID table 142 of the number of the immediately preceding message (S23).

Thus, an extra packet that is duplicated and thus received may be deleted, and furthermore, the IPID tables 122 and 142 may be cleared at an early point, so that the consumption of a memory capacity may be reduced. Also, packets are sorted to CPUs in units of messages, and therefore, the degree of freedom of sort is increased, as compared to the case where sort is performed in units of sessions, and thus, processing load may be efficiently distributed.

Next, details of processing according to this embodiment will be described with reference to FIG. 11 to FIG. 17.

Figure 11:
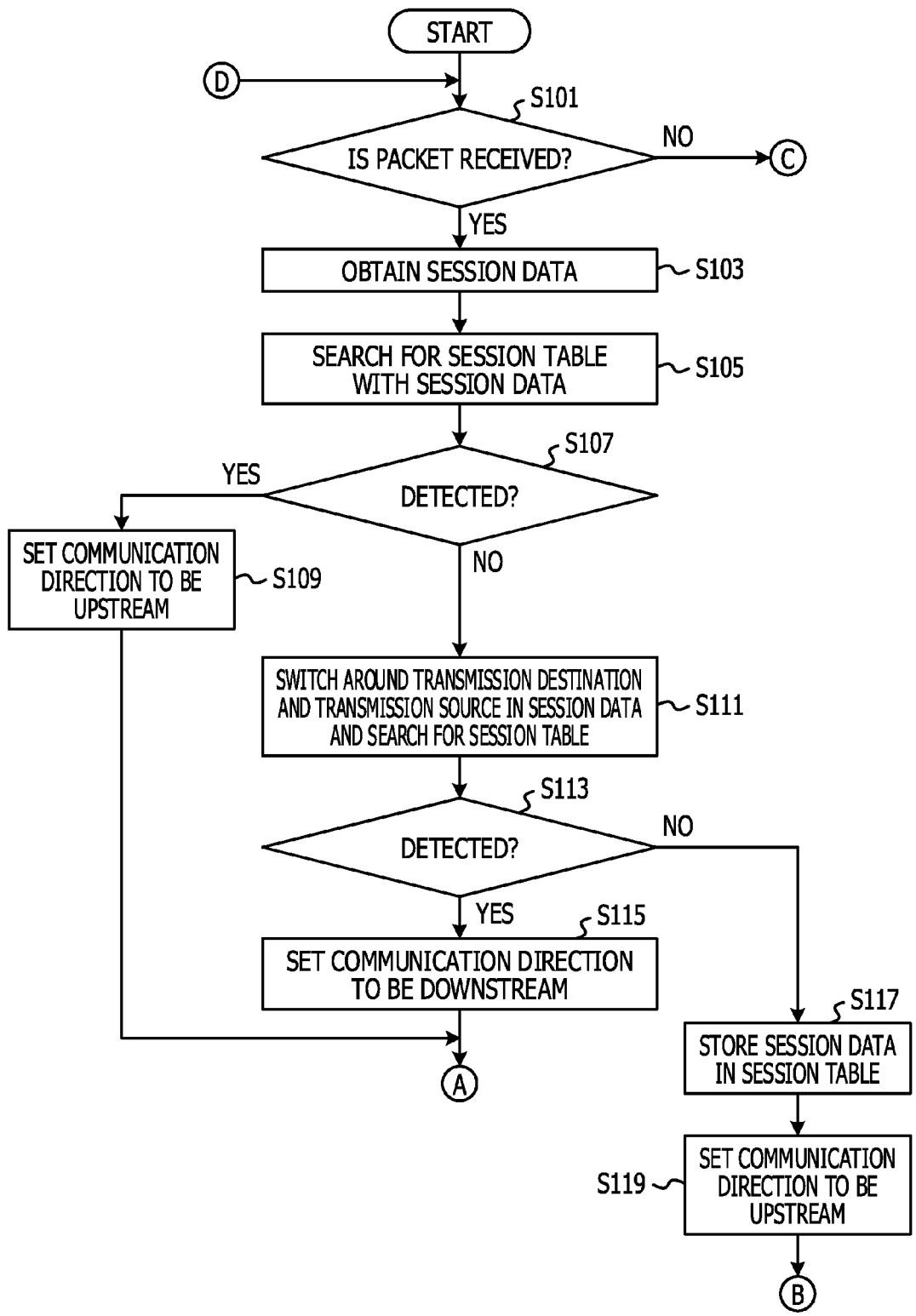
FIG. 11 is a flow chart illustrating a processing flow according to the first embodiment.

The packet receiving unit 114 of the L4 analysis unit 110 in CPU 0 waits for receiving a packet (S101 in FIG. 11). That is, if a packet reception is not performed, the process proceeds to S139 via a terminal C.

On the other hand, when the packet receiving unit 114 receives a packet, the packet receiving unit 114 outputs the received packet to the session identification unit 113. The session identification unit 113 that has received the packet reads out session data from the packet (S103).

Figure 12:
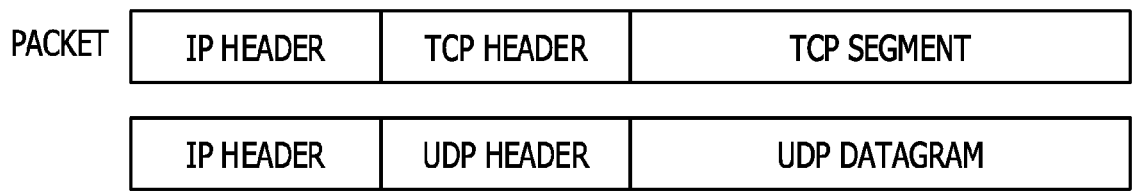
FIG. 12 is a diagram illustrating a format of an IP packet.

FIG. 12 illustrates a structure of an IP packet of a packet. In the example of FIG. 12, the upper part illustrates a structure of an IP packet including an IP header and a TCP packet (a TCP header and a TCP segment). The lower part illustrates a structure of an IP packet including an IP header and a UDP packet (a UDP header and a UDP datagram).

Figure 13:
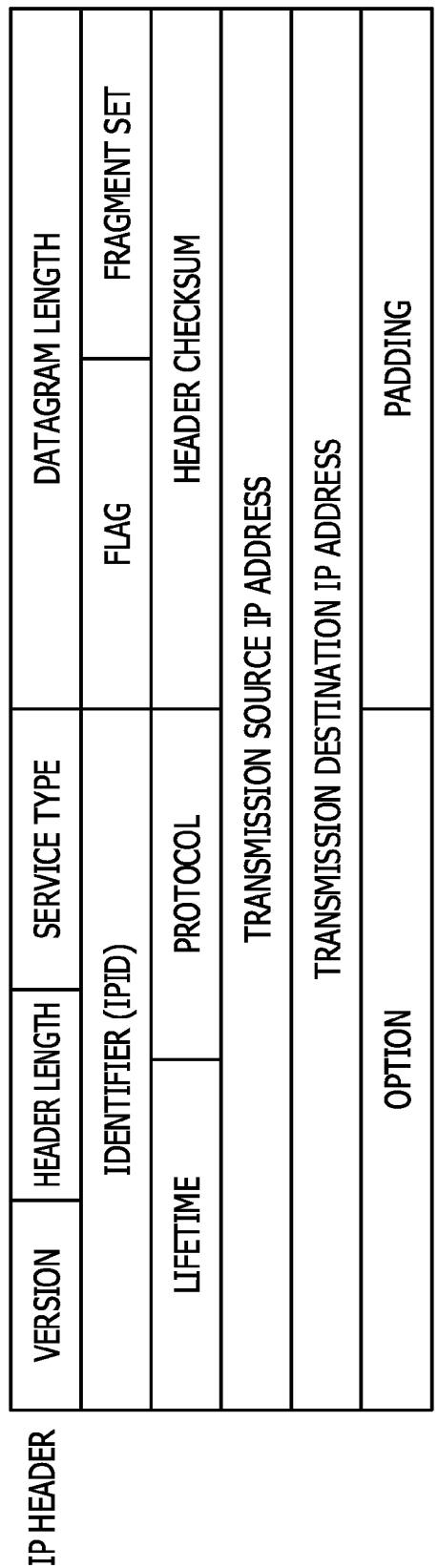
FIG. 13 is a diagram illustrating a structure of an IP header.

FIG. 13 illustrates a structure of an IP header. The structure of an IP header is well known. In this embodiment, an identifier (IPID), a transmission source IP address, and a transmission destination IP address are extracted from the IP header.

FIG. 14 illustrates a structure of a TCP header. The structure of a TCP header is also well known. A transmission source port number and a transmission destination port number are extracted from the TCP header.

FIG. 15 illustrates a structure of a UDP header. The structure of a UDP header is also well known. A transmission source port number and a transmission destination port number are extracted from the UDP header.

The session data includes a transmission source IP address, a transmission destination IP address, a transmission source port number, and a transmission destination port number.

The head detection unit 112 performs a search for session data read out in the session table 115 by the session identification unit 113 (S105). If the read-out session data is detected in the session table 115 (YES route in S107), a packet of a message in the session that has been already detected, is received, and thus, session data that is the same as that of the request message that has been detected first has been detected. Accordingly, the head detection unit 112 sets the communication direction to be upstream (S109). Specifically, the head detection unit 112 holds the transmission destination IP address (=a connection destination IP address). Then, the process proceeds to processing illustrated in FIG. 16 via a terminal A.

On the other hand, if the read-out session data is not detected in the session table 115 (NO route in S107), the head detection unit 112 switches around the transmission destination and the transmission source in the session data, and then, performs a search for the session table 115 (S111).

If the session data that has been changed in the above-described manner is detected in the session table 115 (YES route in S113), a packet of a message in the session that has been already detected is received, but a packet transmitted in an opposite communication direction to that of the request message that which has been detected first. Therefore, the head detection unit 112 sets the communication direction to be downstream (S115). Specifically, the head detection unit 112 holds a transmission destination IP address (=a connection source IP address). Then, the process proceeds to the processing illustrated in FIG. 16 via the terminal A.

On the other hand, if the session data that has been changed is not detected in the session table 115 (NO route in S113), a new session is detected. Accordingly, the head detection unit 112 additionally stores the read-out session data in the session table 115 (S117). Furthermore, the head detection unit 112 sets the communication direction to be upstream (S119). Specifically, the head detection unit 112 holds the transmission destination IP address. Then, the process proceeds to the processing of S131 illustrated in FIG. 16 via a terminal B.

Figure 16:
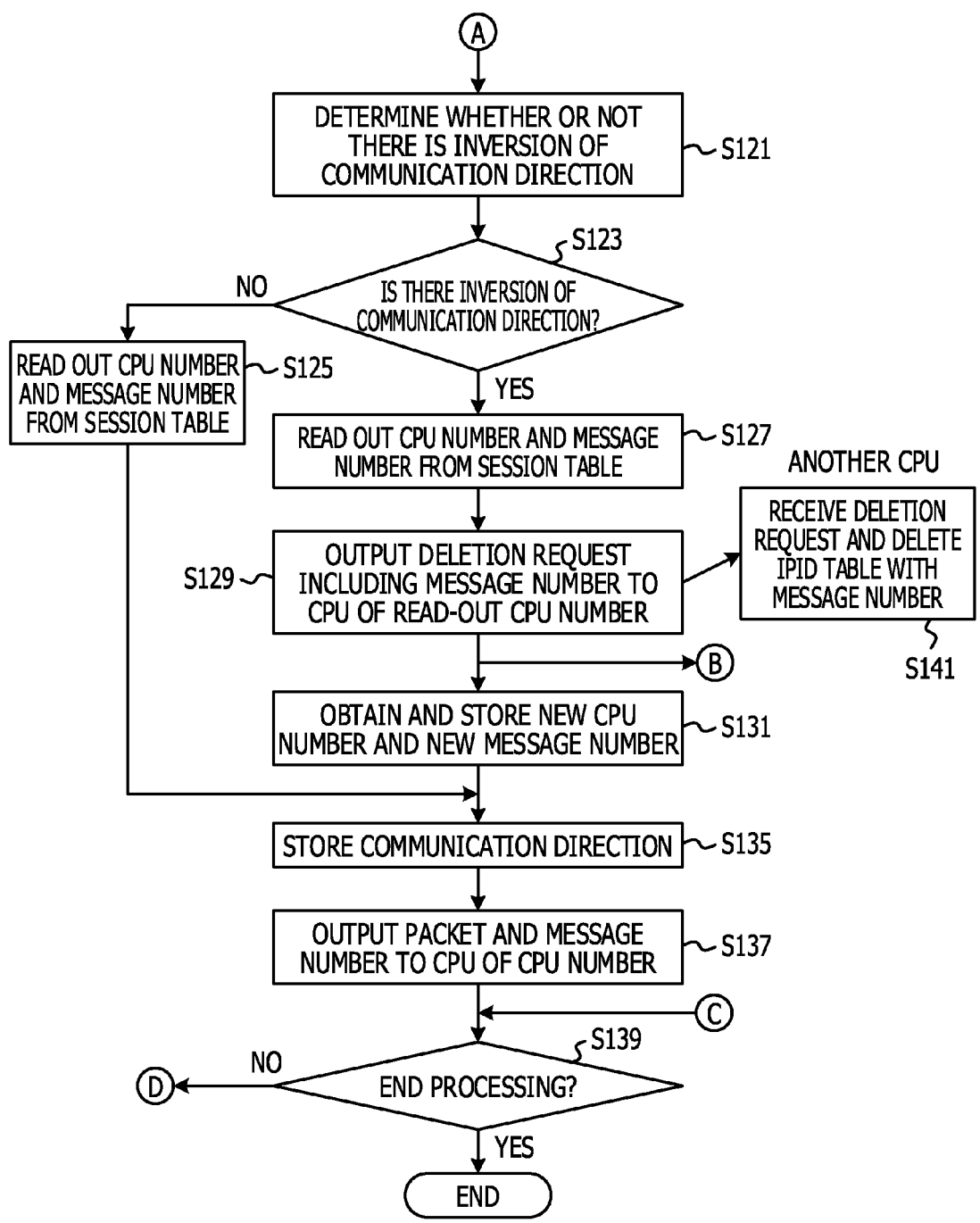
FIG. 16 is a flow chart illustrating a processing flow according to the first embodiment.

The description moves to the processing of FIG. 16, and the head detection unit 112 determines, after the terminal A, whether or not the communication direction has been inverted by determining whether or not a latest communication direction associated with the session data in the session table 115 and the communication direction that has been set match each other (S121). If the latest communication direction and the communication direction that has been set matches each other, the communication direction has not been inverted. If the latest communication direction and the communication direction that has been set do not match each other, the communication direction has been inverted.

If it is determined that there is not an inversion of the communication direction (NO route in S123), the packet sort unit 111 reads out current CPU and the message number that are associated with the session data from the session table 115 (S125). Then, the process proceeds to S135. If there is not an inversion of the communication direction, processing of S135 is executed in order to output a packet to current CPU.

On the other hand, if it is determined that there is an inversion of the communication direction (YES route in S123), the packet sort unit 111 reads out current CPU and the message number that are associated with the session data from the session table 115 (S127). Furthermore, the packet sort unit 111 outputs a deletion request including the message number to CPU of the CPU number that has been read out (S129). Then, the process proceeds to S131.

In contrast, for example, when the packet processing unit 121 of the L4 analysis unit 120 in CPU 1 receives the deletion request, the packet processing unit 121 deletes the IPID table of the message number included in the deletion request (S141). That is, if it is determined that the communication direction has been inverted and the message is changed in the same session, the IPID table for the previous message is no longer used, and therefore, is deleted. Thus, a memory may be effectively used.

After the processing of S129, the packet sort unit 111 obtains a new CPU number and a new message number from the sort table 116 and the number storage unit 117. Then, the packet sort unit 111 stores the new CPU number and the new message number in association with the session data in the session table 115 (S131). The number of messages which are handled by each CPU is registered in the sort table 116, and therefore, the packet sort unit 111 reads out the number of CPU with the smallest one of the numbers of messages which are handled by each CPU, and increments the number of the messages corresponding to the CPU number by 1, in order to evenly sort packets. Furthermore, the packet sort unit 111 reads out the current message number from the number storage unit 117 and adopts, as a new message number, a number obtained by adding 1 to the message number. Furthermore, the packet sort unit 111 updates the message number stored in the number storage unit 117 with the new message number.

Furthermore, the packet sort unit 111 stores the communication direction (the transmission destination IP address) that has been set in association with the session data in the session table 115 (S135).

Then, the packet sort unit 111 outputs the packet and the message number (the message number read out in S125 or the new message number obtained in S131) relating to the processing to CPU of the CPU number (the CPU number read out in S125 or the new CPU number obtained in S131) (S137).

Thereafter, the L4 analysis unit 110 determines whether or not the process is to be ended (S139). If the process is not to be ended, the process returns to S101 of FIG. 11 via a terminal D. On the other hand, if the process is to be ended by an instruction for ending the process, or the like, the process is ended.

In the above-described manner, it is detected that a different message is received in accordance with an inversion of the communication direction in the same session, and thus, an extra packet that is duplicated and thus received may be deleted while the IPID table is cleared and the usage of a memory is reduced.

Figure 17:
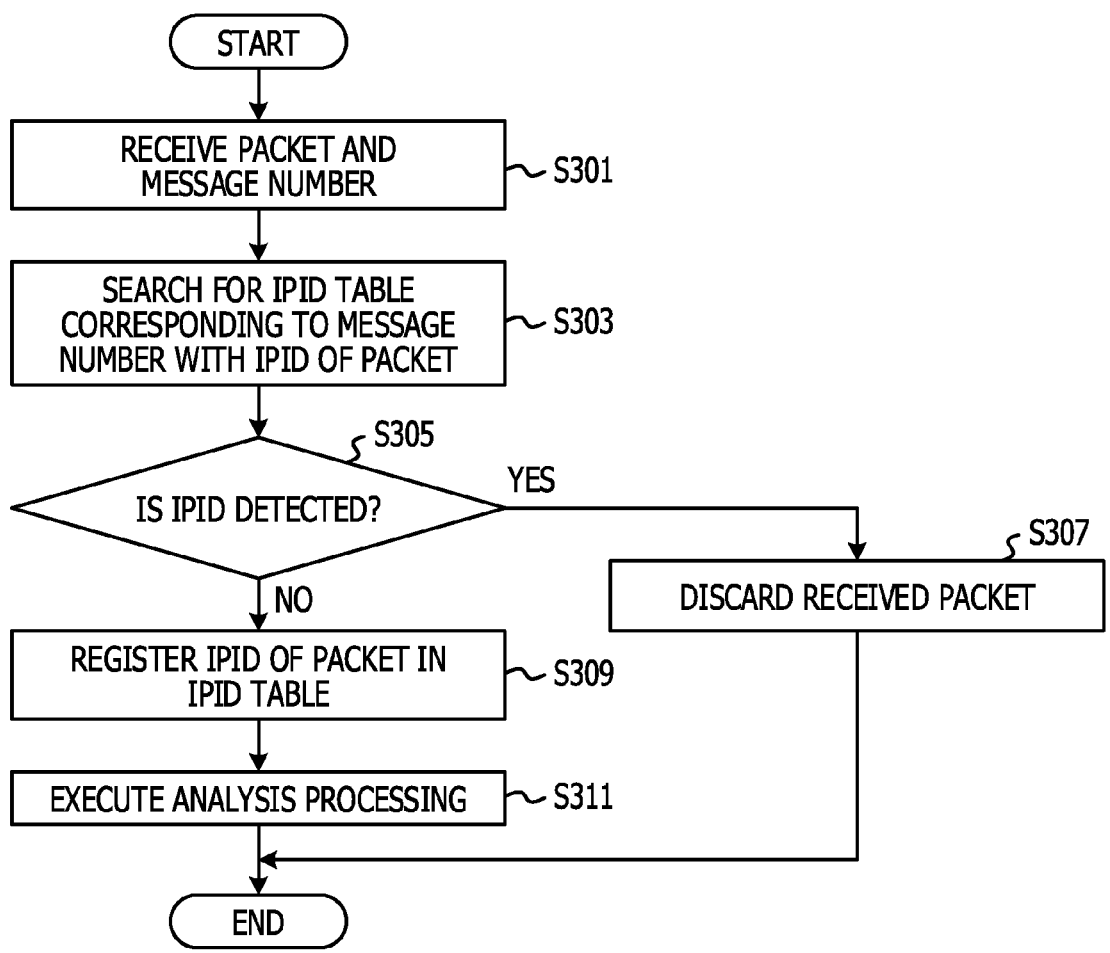
FIG. 17 is a flow chart illustrating a processing flow according to the first embodiment.

In CPU 1 and CPU 2, processing illustrated in FIG. 17 is performed. That is, for example, when the packet processing unit 121 of the L4 analysis unit 120 in CPU 1 receives a packet and a message number from CPU 0 (S301), the packet processing unit 121 specifies the IPID table 122 that corresponds to the message number, and performs a search for the IPID table 122 using IPID included in the packet (S303).

If IPID is detected in the IPID table 122 that corresponds to the message number is detected (YES route in S305), the received packet is an extra packet that is duplicated and thus received, and thus, the packet processing unit 121 discards the received packet (S307). Then, the process is ended. The size of the IPID table 122 is small because IPID is provided for each message, and a processing time of search processing is short, as compared to the case where IPID is managed in units of sessions.

On the other hand, if IPID is not detected in the IPID table 122 that corresponds to the message number (NO route in S305), the received packet is a packet that has been received for the first time, and thus, the packet processing unit 121 registers IPID of the packet in the IPID table 122 (S309). Then, the packet processing unit 121 outputs the received packet to the L7 analysis unit 130. The L7 analysis unit 130 executes analysis processing for the received packet (S311).

Thus, an extra packet that has been duplicated and thus received is discarded, and a new packet is processed by the L7 analysis unit 130.

Second Embodiment

Figure 18:
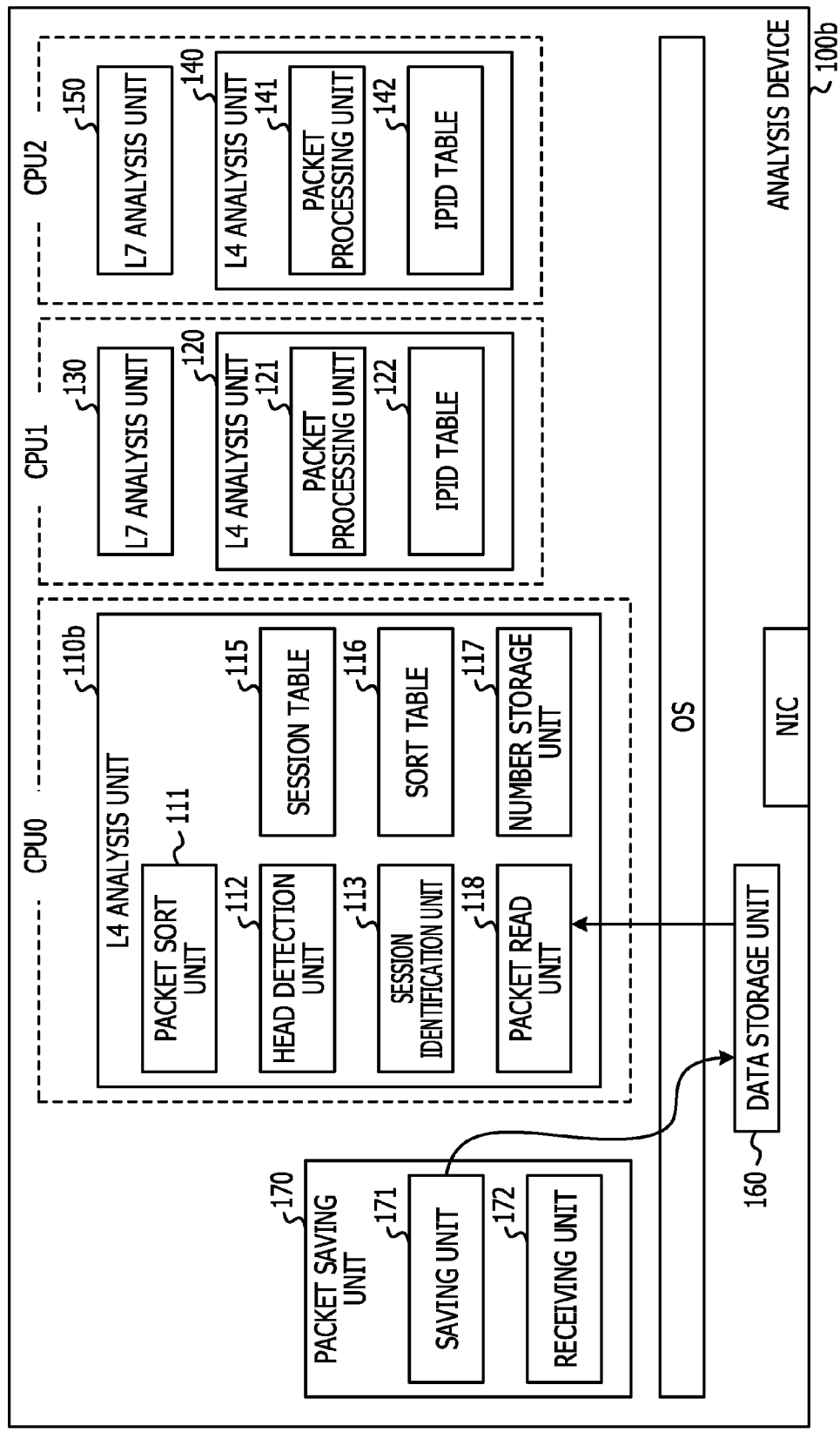
FIG. 18 is a function block diagram of an analysis device according to a second embodiment.

In the first embodiment, an example where the packet receiving unit 114 receives a packet via NIC and OS and the processing is thus performed has been described. In contrast, for example, a configuration illustrated in FIG. 18 may be employed. That is, a packet saving unit 170 including a receiving unit 172 and a saving unit 171 is introduced and, when the receiving unit 172 receives a packet, the saving unit 171 stores the received packet in a data storage unit 160.

The L4 analysis unit 110b includes, instead of the packet receiving unit 114, a packet read unit 118. The packet read unit 118 reads out, after a start of processing, packets stored in the data storage unit 160 in the order in which the packets were stored, and executes subsequent processing.

Thus, L4 analysis processing and L7 analysis processing may be executed with a different timing from that in packet reception.

Embodiments have been described above, but the present disclosure is not limited to the above-described embodiments. For example, the function block configuration is an example, and there may be cases where the function block configuration does not match a program module configuration. Furthermore, regarding a processing flow, the order of processes may be changed and a plurality of steps may be executed in parallel unless the processing result is changed.

Furthermore, an example where CPU 0 to CPU 2 share the functions has been described, but for example, the above-described processing may be executed using a plurality of single processor computers, and for example, there may be cases where CPU 2 is included in a different computer.

Figure 19:
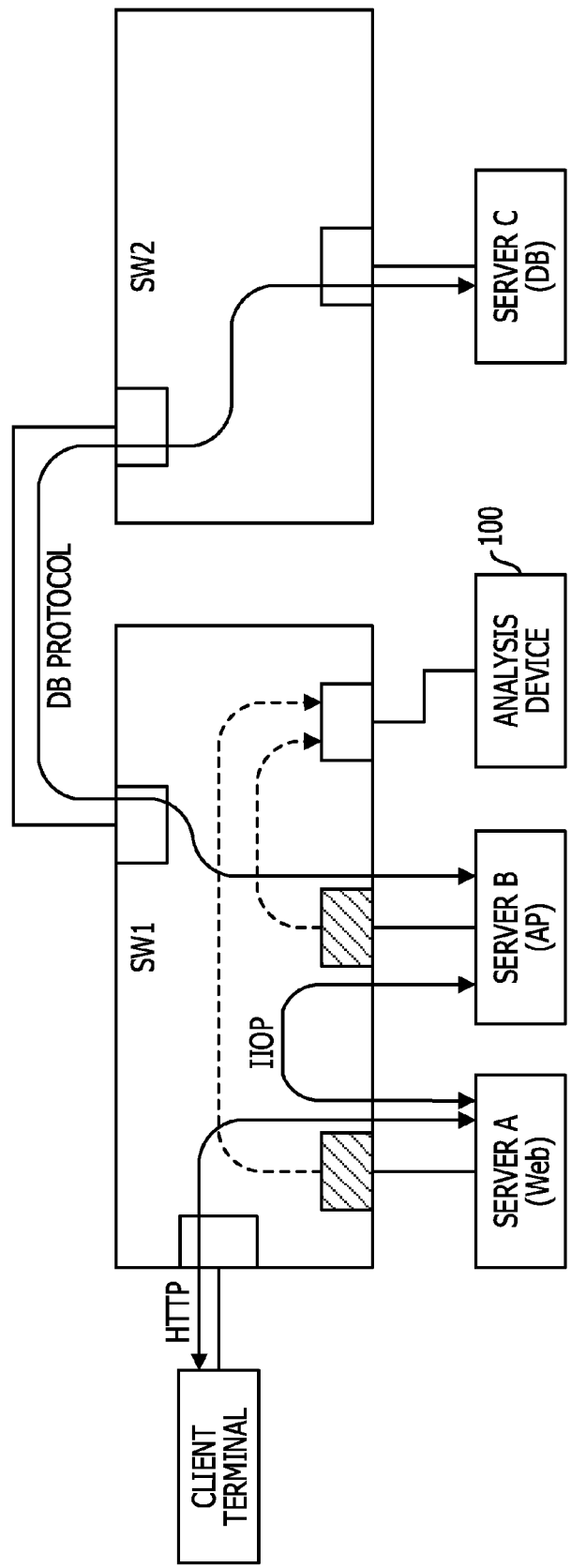
FIG. 19 is diagram illustrating another system example.

Furthermore, in the example of FIG. 2, the analysis device 100 is coupled to a plurality of ports of a plurality of switches, but there may be cases where the analysis device 100 is coupled to neither a plurality of switches nor a plurality of ports. For example, even in a case illustrated in FIG. 19, the analysis device 100 is effective. Specifically, a client terminal, a server A (for example, a Web server), a server B (for example, an AP server), the analysis device 100, and the switch SW2 are coupled to the switch SW1. On the other hand, a server C (for example, a DB server) is coupled to the switch SW2, but the switch SW2 does not have the function of mirroring.

Thus, the switch SW1 designates, as monitor target ports, ports to which the server A and the server B are coupled. Then, the switch SW1 outputs a packet copied by mirroring to a port to which the analysis device 100 is coupled. Thus, a hyper text transfer protocol (HTTP) packet transmitted between the client terminal and the server A and an Internet inter-ORB protocol (IIOP) transmitted between the server A and the server B are captured from the port to which the server A is coupled. On the other hand, an IIOP packet transmitted between the server A and the server B and a DB protocol packet transmitted between the server B and the server C are captured from the port to which the server B is coupled. Thus, the IIOP packets transmitted between the server A and the server B overlap each other.

In the above-described situation, an extra packet that is duplicated and thus received may be correctly discarded, furthermore, the usage of a memory may be reduced, and the speed of processing may be increased.

Figure 20:
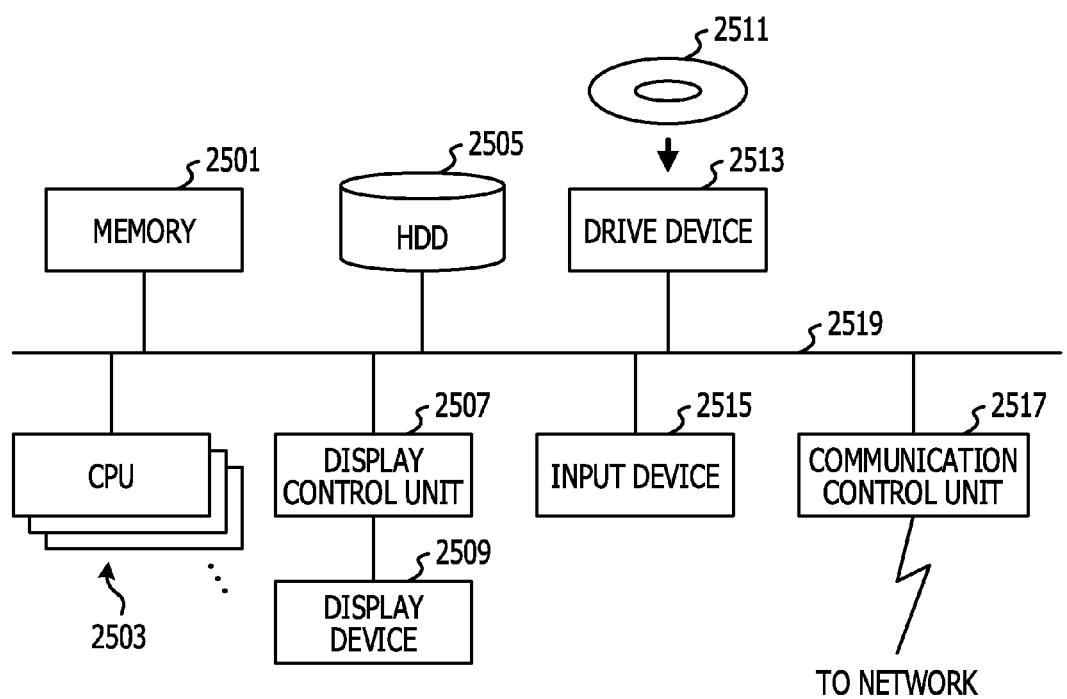
FIG. 20 is a function block diagram of a computer.

The above-described analysis device 100 is a computer device and, as illustrated in FIG. 20, is configured such that a memory 2501, a central processing unit (CPU) group 2503, a hard disk drive (HDD) 2505, a display control unit 2507 coupled to a display device 2509, a drive device 2513 for a removable disk 2511, an input device 2515, and a communication control unit 2517 that provides connection to a network are coupled to one another via a bus 2519. An operating system (OS) and an application program used for performing processing described in this embodiment are stored in HDD 2505. When the application program is executed by the CPU group 2503, the application program is read out from HDD 2505 to the memory 2501. The CPU group 2503 controls the display control unit 2507, the communication control unit 2517, and the drive device 2513 in accordance with the processing contents of the application program to cause each of them to perform a predetermined operation. Data that is being processed is stored mainly in the memory 2501 but may be stored in HDD 2505. In an embodiment of the present technique, an application program used for performing the above-described processing is stored in a computer-readable removable disk 2511 and thus distributed, and is installed in HDD 2505 from the drive device 2513. There are cases where the application program is installed in HDD 2505 via a network, such as the Internet, or the like, and the communication control unit 2517. Such a computer device organically cooperates with hardwares, such as the CPU group 2503, the memory 2501, and the like, OS, and a program, such as an application program, and the like, and thereby realizes the above-described various types of functions.

This embodiment has been described above, and will be summarized as follows.

A duplicate packet removing method according to this embodiment includes (A) determining whether or not an identifier of a first packet received from a predetermined port in one or more communication devices is stored in a storage unit that stores an identifier of a packet, (B) discarding, if it is determined that the identifier of the first packet is stored in the storage unit, the first packet, (C) storing, if it is determined that the identifier of the first packet is not stored in the storage unit, the identifier of the first packet in the storage unit, and (D) deleting, if it is detected that a second packet that relates a session that is the same as a session that relates a packet an identifier of which is stored in the storage unit, and is transmitted in an inverted communication direction, the identifier stored in the storage unit.

Thus, it may be detected that different messages have been received in the same session, so that the identifier of a packet managed in units of messages may be discarded using the reception of a different message as a trigger and, as a result, the usage of a memory may be reduced.

Furthermore, the above-described duplicate packet removing method may further include (E) selecting, if the second packet is received, one processing unit from a plurality of processing units that execute processing of (A) to (D), and (F) outputting the second packet to the selected processing unit. Thus, load may be distributed in units of messages, and a processing unit may be flexibly selected.

Furthermore, the above-described duplicate packet removing method may further include (G) determining whether or not a session relating to a third packet received from a predetermined port has been already detected from a second storage unit that stores, for each session, an identifier of one of the plurality of processing units which currently handles the session and a communication direction in the session, (H) determining, if it is determined that the session relating to the third packet has been already detected, whether or not the communication direction has been inverted from the third packet from the second storage unit, (I) selecting, if it is determined that the communication direction has been inverted from the third packet, a processing unit from a plurality of processing units, and (J) updating the second storage unit with the communication direction of the third packet and an identifier of the selected processing unit.

Thus, an inversion of the communication direction may be reliably detected. Moreover, the identifier of a processing unit is held, and therefore, a packet included in a message that is currently being received may be easily transmitted to the same processing unit.

Also, the above-described duplicate packet removing method may further include (K) giving an identifier of a message to a message including the third packet, and (L)

outputting the identifiers of the third packet and the message to the selected processing unit. Thus, it is simplified to manage the identifier of a packet for each message in the processing units by giving and using the identifier of a message. The identifier of a message may be stored in association with a session in the second storage unit.

A program used for causing a processor or a computer to execute the above-described processing may be created. The program is stored, for example, in a flexible disk, an optical disk, such as a CD-ROM, or the like, a magneto-optical disk, a semiconductor memory (for example, ROM), a computer-readable memory medium, such as a hard disk, or the like, or a memory device. Data that is being processed is temporarily stored in a memory device, such as RAM, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A determination method executed by a plurality of processors included in a device coupled to one or more switches disposed on a path between a first device and a second device, the determination method comprising:
   receiving, by a first processor among the plurality of processors, a first copied packet that is a copy of a first packet transmitted from the first device toward the second device, the first packet including an identifier and session information;
   determining, based on the session information, whether the first packet is a head packet of a predetermined message;
   selecting a second processor from the plurality of processors so that all packets belonging to the predetermined message are allocated to an identical processor when it is determined that the first packet is not the head packet;
   specifying the second processor that handles an immediately preceding message before the predetermined message, which belongs to a session that is the same as a session of the first packet when it is determined that the first packet is the head packet;
   transferring the first copied packet to the second processor;
   determining, by the second processor, that the first copied packet is a duplicate packet when information of the identifier is stored in a memory included in the device;
   storing the information of the identifier in the memory when the information of the identifier is not stored in the memory; and
   deleting the information of the identifier stored in the memory when a second copied packet that is a copy of a second packet that includes session information indicating a session that is the same as a session indicated by the session information included in the first packet, the second packet being transmitted from the second device to the first device, is received,
   wherein the deleting includes deleting information relating the immediately preceding message stored in a memory coupled to a processor that is processing the immediately preceding message.

2. The determination method according to claim 1, further comprising
   discarding, by the second processor, the first copied packet when information of the identifier is stored in the memory.

3. The determination method according to claim 1,
   wherein the specifying includes specifying the second processor that is processing a message that corresponds to the first packet from the plurality of processors when it is determined that the first packet is not the head packet.

4. The determination method according to claim 1,
   wherein the selecting includes selecting the second processor when the first packet that includes the session information including connection destination address, connection destination port number, connection source address, and connection source port number of the session, is received.

5. The determination method according to claim 1, further comprising:
   storing, for a plurality of processors as a unit, information of the number of messages for which processing is handled by each of the processors,
   wherein the selecting includes selecting the second processor based on the number of messages stored for the plurality of processors as a unit.

6. The determination method according to claim 5,
   wherein the selecting includes selecting the second processor that corresponds to a smallest one of the numbers of messages.

7. A device configured to be coupled to one or more switches disposed on a path between a first device and a second device, the device comprising:
   a memory; and
   a plurality of processors coupled to the memory and configured to:
      receive, by a first processor among the plurality of processors, a first copied packet that is a copy of a first packet transmitted from the first device toward the second device, the first packet including an identifier and session information,
      determine, based on the session information, whether the first packet is a head packet of a predetermined message,
      select a second processor from the plurality of processors so that all packets belonging to the predetermined message be allocated to an identical processor when it is determined that the first packet is not the head packet,
      specify the second processor that handles an immediately preceding message before the predetermined message, which belongs to a session that is the same as a session of the first packet, when it is determined the first packet is the head packet,
      transfer the first copied packet to the second processor,
      determine, by the second processor, that the first copied packet is a duplicate packet when information of the identifier is stored in a memory included in the device,
      store the information of the identifier in the memory when the information of the identifier is not stored in the memory, and
      delete the information of the identifier stored in the memory when a second copied packet that is a copy of a second packet that includes session information indicating a session that is the same as a session indicated by the session information included in the first packet, the second packet being transmitted from the second device to the first device, is received, wherein the second processor is configured to delete information relating to the immediately preceding message stored in a memory coupled to a processor that is processing the immediately preceding message.

8. The device according to claim 7,
wherein the second processor is configured to discard the first copied packet when information of the identifier is stored in the memory.

9. The device according to claim 7,
wherein the first processor is configured to select the second processor when the first packet that includes the session information including connection destination address, connection destination port number, connection source address, and connection source port number of the session, is received.

10. A non-transitory computer-readable storage medium storing a program that causes a plurality of processors included in a computer to execute a process, the computer being coupled to one or more switches disposed on a path between a first device and a second device, the process comprising:

receiving, by a first processor among the plurality of processors, a first copied packet that is a copy of a first packet transmitted from the first device toward the second device, the first packet including an identifier and session information;

determining, based on the session information, whether the first packet is a head packet of a predetermined message;

selecting a second processor from the plurality of processors so that all packets belonging to the predetermined message be allocated to an identical processor when it is determined that the first packet is not the head packet;

specifying the second processor that handles an immediately preceding message before the predetermined message, which belongs to a session that is the same as a session of the first packet when it is determined that the first packet is the head packet;

transferring the first copied packet to the second processor;

determining, by the second processor, that the first copied packet is a duplicate packet when information of the identifier is stored in a memory included in the device;

storing the information of the identifier in the memory when the information of the identifier is not stored in the memory; and deleting the information of the identifier stored in the memory when a second copied packet that is a copy of a second packet that includes session information indicating a session that is the same as a session indicated by the session information included in the first packet, the second packet being transmitted from the second device to the first device, is received, wherein the deleting includes deleting information relating to the immediately preceding message stored in a memory coupled to a processor that is processing the immediately preceding message.

11. The storage medium according to claim 10, wherein the process further comprising
discarding, by the second processor, the first copied packet when information of the identifier is stored in the memory.

12. The storage medium according to claim 10,
wherein the selecting includes selecting the second processor when the first packet that includes the session information including connection destination address, connection destination port number, connection source address, and connection source port number of the session, is received.

\* \* \* \* \*